United States Patent
Tomassi et al.

(10) Patent No.: US 10,630,103 B2
(45) Date of Patent: Apr. 21, 2020

(54) AUTOMATIC TRANSFER SWITCH (ATS) BYPASS SWITCH

(71) Applicant: EATON CORPORATION, Cleveland, OH (US)

(72) Inventors: Mark Steven Tomassi, Waynesville, NC (US); Scott Morgan Williams, Etowah, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 360 days.

(21) Appl. No.: 15/206,917

(22) Filed: Jul. 11, 2016

(65) Prior Publication Data

US 2016/0322864 A1 Nov. 3, 2016

Related U.S. Application Data

(63) Continuation of application No. 14/134,270, filed on Dec. 19, 2013, now Pat. No. 9,419,473.

(51) Int. Cl.
*H01H 9/26* (2006.01)
*H02J 9/06* (2006.01)

(52) U.S. Cl.
CPC ............. *H02J 9/061* (2013.01); *H01H 9/26* (2013.01); *H02J 9/06* (2013.01); *H01H 2300/018* (2013.01); *Y10T 307/615* (2015.04)

(58) Field of Classification Search
CPC ............................. H02J 9/06; Y10T 307/615
USPC ......................................... 307/64, 125, 126
See application file for complete search history.

(56) References Cited

U.S. PATENT DOCUMENTS

| 7,973,253 | B2 * | 7/2011 | Gibbs | H02J 9/06 200/50.12 |
| 2010/0141047 | A1 | 6/2010 | Gibbs et al. | |
| 2014/0260731 | A1 * | 9/2014 | Devanand | F16H 25/20 74/89.23 |

OTHER PUBLICATIONS

Eaton, "Transfer Switch", Sep. 2011, Sheet 25011-25086.

* cited by examiner

*Primary Examiner* — Carlos Amaya
*Assistant Examiner* — Toan T Vu
(74) *Attorney, Agent, or Firm* — Eckert Seamans Cherin & Mellott, LLC

(57) ABSTRACT

An ATS bypass switch includes a draw-out ATS switch; a bypass switch; and a processor structured to automatically control both of the draw-out ATS switch and the bypass switch.

25 Claims, 9 Drawing Sheets

AUTOMATIC TRANSFER SWITCH (ATS) BYPASS SWITCH

CROSS-REFERENCE TO RELATED APPLICATIONS

This application is a continuation of, and claims priority under 35 U.S.C. § 120 from, U.S. patent application Ser. No. 14/134,270, filed Dec. 19, 2013, entitled "AUTOMATIC TRANSFER SWITCH (ATS) BYPASS SWITCH", the contents of which are incorporated herein by reference.

BACKGROUND

Field

The disclosed concept pertains generally to transfer switches and, more particularly, to automatic transfer switches including a first automatic transfer switch and a second bypass switch.

Background Information

Transfer switches are employed to protect critical electrical loads against loss of power from a first power source backed up by a second power source. The transfer switch is electrically connected to both of the power sources and supplies a number of loads with power from one of the two power sources. In the event that power is lost from the first power source, the transfer switch transfers the load to the second power source. This transfer can be manual or automatic. After the first power source is restored, the load is transferred back to the first power source.

In an automatic transfer switch (ATS), a controller or other intelligence of the ATS initiates the transfer when the first power source fails or falls below, or rises above, a predetermined voltage. If the second power source is a standby generator, then the ATS initiates generator startup and transfers to the second power source when sufficient generator voltage is available. When the first power source is restored, the ATS automatically transfers back to the first power source and initiates generator shutdown. In the event that the first power source fails and the second power source does not appear, then the ATS remains electrically connected to the first power source until the second power source does appear. Conversely, if electrically connected to the second power source and the second power source fails while the first power source is still unavailable, then the ATS remains electrically connected to the second power source.

An ATS automatically performs the transfer functions and can include, for example and without limitation, a power contactor or two circuit breakers to implement the ATS operations, and a controller (or other intelligence or supervisory circuit) to constantly monitor the condition of the power sources and provide automatic control of the switch and related circuit operation.

Certain systems and installations (e.g., without limitation, data centers; hospitals; water treatment plants; other critical processes that need the constant supply of power to a system load) employ a power system structured to provide an uninterruptable power supply (UPS). UPSs are well known. The first or primary power source is usually an electric utility or the public power grid, and the second or secondary power source is usually a generator. Alternatively, there could be two generators used instead of the utility or public power grid, or there could be two utilities. Basically, any suitable power sources that need to be switched with a load output can be employed.

A bypass/isolation switch is an assembly used with a transfer switch to select an available power source to feed load circuits, and to electrically isolate the transfer switch for inspection and maintenance.

An ATS bypass assembly has two separate switch assemblies or switches (e.g., an ATS switch and a bypass switch) that can transfer power to the system load. Each of the two switches has two positions to power the load from the first and second power sources. For example and without limitation, each of the two switches can be provided by a three-position contactor or two circuit breakers. For example, a three-position switch has the capability of having a first position electrically connected to the first power source, a second position electrically connected to the second power source, and a third neutral, open or trip position between the first and second positions. Both the ATS switch and the bypass switch are normally electrically connected to the system load. Furthermore, each of the ATS and bypass switches can be structured, for example, for use with single-phase or three-phase systems. These switches can selectively engage one power source at a time unless a closed transition type scenario is applied.

Typically, the entire ATS bypass assembly is called a "switch" and includes two sub-switches: the ATS sub-switch and the bypass sub-switch. The ATS sub-switch (hereinafter, "ATS switch") is the main sub-switch used to transfer power. The bypass sub-switch (hereinafter, "bypass switch") is typically used when the ATS switch is undergoing maintenance. The ATS switch is structured to easily be removed for maintenance. The bypass switch is usually fixed within the enclosure of the ATS bypass assembly, although a removable type of bypass switch is known. See, for example, U.S. Pat. No. 7,973,253.

If the bypass switch is a fixed type, the main difference between the ATS switch and the bypass switch (for contactors) used in the ATS bypass switch is that the bypass contactors are fixed with no truck or rail enabling draw-out. Otherwise, with a dual draw-out version of the bypass switch, both contactors can be removed (e.g., by trucks) with the power from the first and second power sources turned off.

For example and without limitation, in the ATS bypass switch, the bottom position of the assembly includes the ATS switch and the top position includes the bypass switch, although any suitable positioning of the two switches is possible.

During the life of the ATS bypass switch, the ATS switch contactors or circuit breakers usually do nearly all of the current transfer for the system loads. The ATS switching device is mounted with safety interlocks, in a "truck" or "slider rail" mechanism, thereby allowing the ATS switching device to be "drawn-out" for service, maintenance and/or replacement.

An ATS draw-out switching device has, for example, three positions with a compartment door closed (e.g., locked in; isolated; removed). See, for example, U.S. Pat. No. 7,973,253. Locked in is the normal operating position. Removed is the position for service, maintenance and/or replacement. In the isolated position, the ATS draw-out switching device is fully electrically disconnected (both the primary and the secondary connectors) from the ATS bypass switch, and is ready for removal. For example, the ATS draw-out switching device includes both primary disconnects (for the first and second power sources, and the load) and secondary disconnects (for control and feedback). The operating mechanism is electrically operated and can also have a mechanical operation if needed in an emergency. When withdrawn (removed), the ATS draw-out switching device can be inspected, tested and suitably maintained.

With the ATS draw-out switching device in the isolated or removed position, the bypass switch can be used to switch the two power sources. Known bypass switches of known ATS bypass switches are either switched manually (with electrical power on one of the two power sources), or switched manually with a suitable tool (with electrical power removed from both of the two power sources).

For example, known bypass switches (e.g., employing contactors or circuit breakers) of known ATS bypass switches operate only manually. Since manual operation is required whenever the ATS switch is removed, personnel (e.g., maintenance personnel) must remain located near the ATS bypass switch if power from the currently employed power source goes off and manual switching of the bypass switch to the other power source is required.

There is room for improvement in ATS bypass switches.

SUMMARY

These needs and others are met by embodiments of the disclosed concept.

In accordance with one aspect of the disclosed concept, an ATS bypass switch comprises: a draw-out ATS switch; a bypass switch; and a processor structured to automatically control both of the draw-out ATS switch and the bypass switch.

In accordance with another aspect of the disclosed concept, an ATS bypass switch comprises: a draw-out ATS switch; a bypass switch including an operating mechanism cooperating with a three-position contactor having a first position structured to electrically connect a system load to a first power source, a second position structured to electrically connect the system load to a second power source, and a third neutral, trip or open position structured to electrically disconnect the system load from both of the first and second power sources; and a processor structured to control both of the draw-out ATS switch and the bypass switch, the processor including a routine cooperating with the operating mechanism: to determine if the first and second power sources synchronize within a first predetermined time and cause the three-position contactor to move from one of the first and second positions to the third neutral, trip or open position and to move from the third neutral, trip or open position to the other one of the first and second positions, and, otherwise, if the first and second power sources do not synchronize within the first predetermined time, to cause the three-position contactor to move from one of the first and second positions to the third neutral, trip or open position, and to move from the third neutral, trip or open position to the other one of the first and second positions after a second predetermined time.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a controller; a digital signal processor; a microprocessor; a microcontroller; a microcomputer; a central processing unit; a mainframe computer; a mini-computer; a server; a networked processor; a programmable logic controller; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "automatic" shall mean that a processor can change the state of a number of switches electrically if permitted by a corresponding logic state. The term "automatic" expressly excludes manual operation.

As employed herein, the term "system load" shall mean any number of loads downstream of an ATS bypass switch. A system load may include, for example and without limitation, loads of a relatively large installation such as a building or manufacturing plant.

As employed herein, the terms "ATS switch" and "bypass switch" are two sub-switches of an ATS bypass switch, and each of the two sub-switches includes two electrical switching apparatus, such as for example and without limitation, two contactors or two circuit breakers each of which can switch a system load to or from a power source.

As employed herein, the term "open transition" shall mean a type of transition for two power sources that has an "off" time during the switching from one to the other of two power sources.

As employed herein, the term "dead time" shall mean an amount of time (e.g., without limitation, described in milliseconds) of the "off" time during the switching from one to the other of two power sources.

As employed herein, the term "overlap" shall mean an amount of time (e.g., without limitation, described in milliseconds) when both of two power sources supply power to a system load.

As employed herein, the term "two-position contactor" shall mean a contactor switch having a first closed position to a first power source and a second closed position to a second power source. There is a dead time between the first and second closed positions.

As employed herein, the term "three-position contactor" shall mean a contactor switch having a first closed position to a first power source, a second closed position to a second power source, and a third open or tripped open position. Typically, a number of suitable time delays can be provided in the third open position, for example, when switching between the first and second closed positions.

Figure 1:
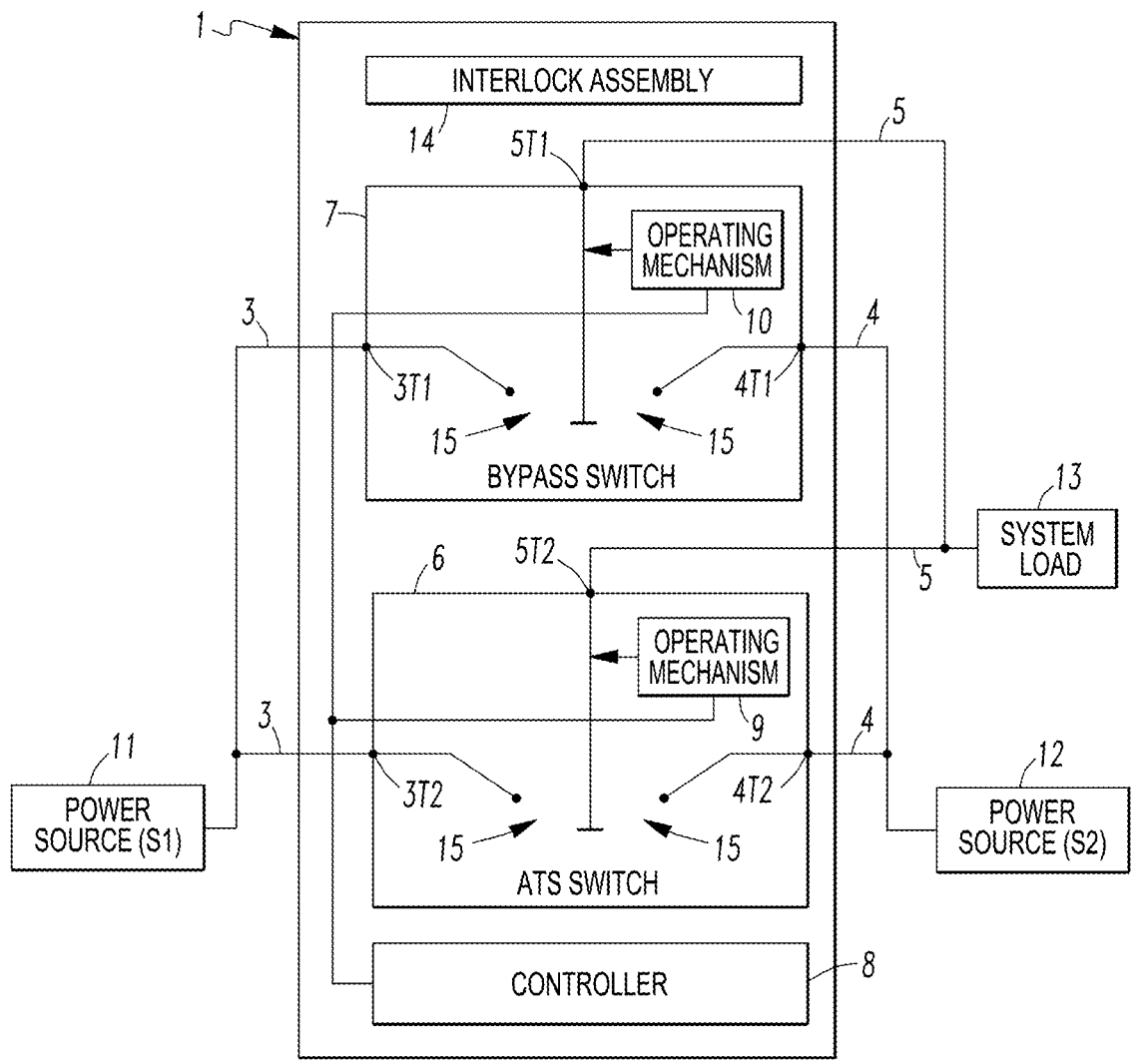
FIG. 1 is a block diagram in schematic form of an automatic transfer switch (ATS) bypass switch having an ATS switch, a bypass switch and a controller in accordance with embodiments of the disclosed concept for a power system including two power sources and a system load.

Referring to FIG. 1, an ATS bypass switch 1 including an ATS switch 6, a bypass switch 7 and a controller 8 is shown. A system load 13 generally receives power through the ATS bypass switch 1 from two separate power sources, namely, a first power source (S1) 11 and a second power source (S2) 12. In this example, the ATS switch 6 is a draw-out switch and the bypass switch 7 can either be a draw-out switch or a fixed switch. Each of the ATS switch 6 and the bypass switch 7 can assume one of an open position (as shown), a first closed position where the system load 13 is electrically connected to the first power source 11, or a second closed position where the system load 13 is electrically connected to the second power source 12. Each of the ATS switch 6 and the bypass switch 7 can be implemented by two electrical switching apparatus, such as for example and without limitation, two contactors or two circuit breakers (not shown, but see the contactor 15 of FIG. 3).

Two first power conductors 3 electrically connect the first power source 11 to first terminals 3T1,3T2 (e.g., without limitation, a line terminal of a first circuit breaker (not shown)) of the ATS switch 6 and the bypass switch 7, two second power conductors 4 electrically connect the second power source 12 to second terminals 4T1,4T2 (e.g., without limitation, a line terminal of a second circuit breaker (not shown)) of the ATS switch 6 and the bypass switch 7, and two third power conductors 5 electrically connect the system load 13 to third terminals 5T1,5T2 (e.g., without limitation, the load terminals of the first and second circuit breakers (not shown)) of the ATS switch 6 and the bypass switch 7.

The bypass switch 7 is coupled to and in electrical communication with one set of the first, second and third power conductors 3,4,5, and has three positions or configurations: (1) a first closed configuration coupling and providing electrical communication between the first power source 11 and the system load 13, (2) a second closed configuration coupling and providing electrical communication between the second power source 12 and the system load 13, and (3) a third (e.g., without limitation, open; tripped; neutral) configuration that does not couple or provide electrical communication between either one of the first and second power sources 11,12 and the system load 13.

Figure 2:
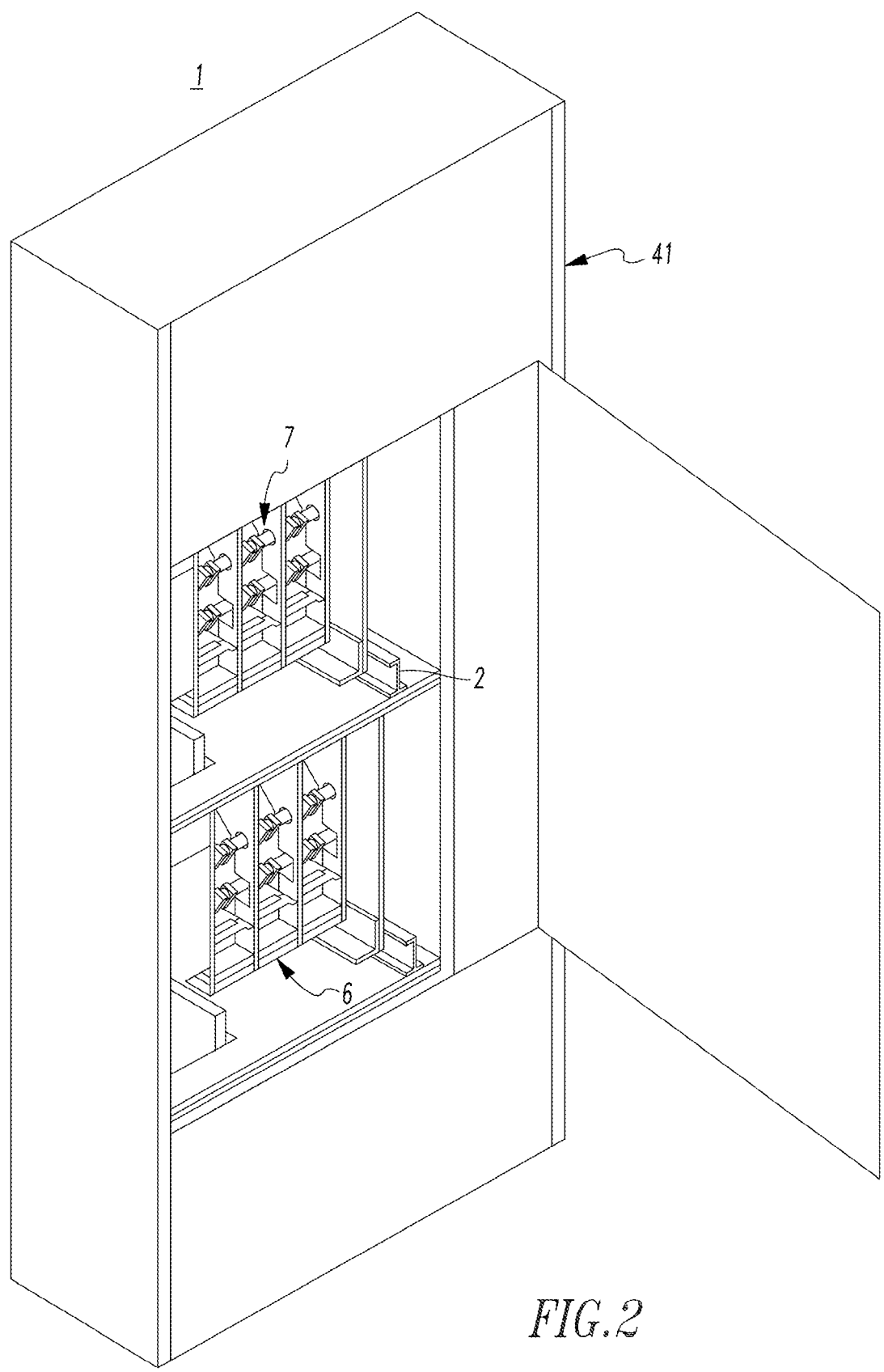
FIG. 2 is a isometric view of a contactor type ATS bypass switch including two draw-out type contactors for the ATS switch of FIG. 1.

As shown in FIG. 2, the ATS bypass switch 1 includes an enclosure 41, the ATS switch 6, the bypass switch 7 and a draw-out mechanism 2 for the ATS switch 6. The example controller 8 is not shown in FIG. 2. The ATS switch 6 and the bypass switch 7 may be substantially similar.

In FIG. 1, the example controller 8 provides automatic control employing any suitable electrical, electromechanical (e.g., without limitation, relays) or electronic devices or any suitable processor that inputs the status of the ATS switch 6 and the bypass switch 7, and outputs electrical control for automatic control of the functions of the ATS bypass switch 1. As a non-limiting example, the controller 8 can be any suitable number of processors, such as an ATS switch controller (not shown) interfaced to a programmable logic controller (PLC) (not shown). As a further non-limiting example, automatic control by the controller 8 encompasses electronic communication (e.g., without limitation, electrically coupled; electronically coupled; sending an electronic pulse, another electrical signal or a wireless signal to the operating mechanisms 9,10 (FIG. 1) of the switches 6,7).

Figure 4:
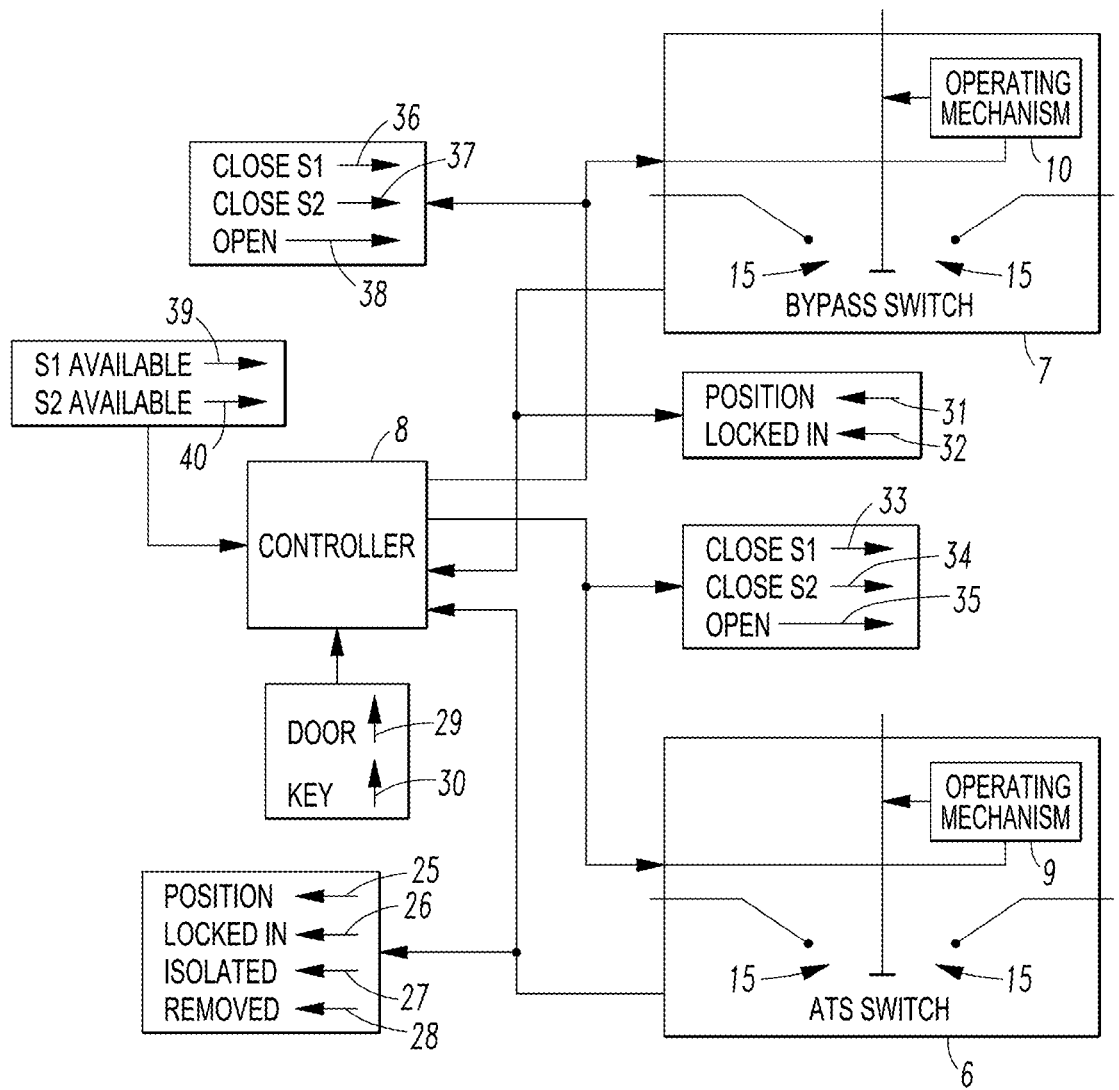
FIG. 4 is a block diagram in schematic form showing control and status signals between the controller and the ATS and bypass switches of FIG. 1.

As a non-limiting example, the ATS switch controller (not shown) of the controller 8 can be an ATC-300+, an ATC-600, an ATC-800 or an ATC-900 ATS switch controller marketed by Eaton Corporation of Arden, N.C., or any other suitable controller. These controllers can sense power line currents and voltages and determine whether the frequency, phase and voltage magnitude of two different power sources, such as 11 and 12, are suitably matched, and can respond to a variety of user commands in connection with the ATS bypass switch 1 (e.g., without limitation, go to neutral; emergency inhibit; go to a second power source; lockout). Alternatively, the ATS switch controller and the PLC (not shown) of the controller 8 can be implemented by any suitable number of processors, such as, for example and without limitation, a single controller. The PLC can receive inputs from a variety of sources (e.g., without limitation, a door (not shown) of the enclosure 41 is closed based upon signal 29 (FIG. 4); a key (not shown) for a lock (not shown) of the door of the enclosure 41 is installed based upon signal 30 (FIG. 4); human interface switches (not shown); inputs from the ATS switch controller) and determine whether to switch and if it is safe to switch between the power sources 11,12. Both of the ATS switch controller and the PLC consider positions of the switches 6,7 from the signals 25,31 (FIG. 4) as well as the locked in status thereof from the signals 26,32 (FIG. 4). In accordance with important aspects of the disclosed concept, the controller 8 provides automatic control of the bypass switch 7.

The ATS switch 6 and the bypass switch 7 include the operating mechanism (e.g., without limitation, switching apparatus; electromagnetic coils; springs) 9 and 10 (FIG. 1), respectively, that operate when a number of signals are presented to it from the controller 8, which is in communication with both of the operating mechanisms 9,10 for automatic control thereof.

The ATS bypass switch 1 may optionally include an interlock assembly 14 (FIG. 1). The interlock assembly 14 can be, for example and without limitation, mechanical cables (not shown) or a suitable electrical circuit that will not allow the ATS switch 6 and the bypass switch 7 to be closed under certain conditions. Position auxiliary contacts (not shown) for signals 25,31 include mechanical and electrical components (not shown) (e.g., without limitation, relatively small switches) to provide information on the positions of the switches 6,7. For example, FIG. 4 shows a signal 25 describing the position of the ATS switch 6 for use in logic decisions, a signal 26 for the ATS switch 6 being locked in (e.g., being racked in all the way to stops), a signal 27 for the ATS switch 6 being isolated, and a signal 28 for the ATS switch 6 being removed. Similarly, a signal 31 describes the position of the bypass switch 7 for use in logic decisions, and a signal 32 is for the bypass switch 7 being locked in. The controller 8 also includes inputs for a signal 29 describing the position (e.g., open; closed) of the door (not shown) of the enclosure 41 and a signal 30 describing the position (e.g., installed; not installed) of a key (not shown) for a lock (not shown) of the door of the enclosure 41. The controller 8 also includes outputs to the operating mechanism 9 of the ATS switch 6 for a signal 33 to close the circuit breaker or contactor (not shown) for the first power source 11, a signal 34 to close the circuit breaker or contactor (not shown) for the second power source 12, a signal 35 to open the two circuit breakers or contactors (not shown) for the first and second power sources 11,12, and outputs to the operating mechanism 10 of the bypass switch 7 for a signal 36 to close the circuit breaker or contactor (not shown) for the first power source 11, a signal 37 to close the circuit breaker or contactor (not shown) for the second power source 12, and a signal 38 to open the two circuit breakers or contactors (not shown) for the first and second power sources 11,12. The controller 8 further includes inputs for a signal 39 indicating that the first power source 11 is available and a signal 40 indicating that the second power source 12 is available.

The disclosed concept advantageously enables the bypass switch 7 (e.g., draw-out or fixed) and its operating mechanism 10 to be automatically controlled by the controller 8, thereby providing an automatic bypass switch 7, such that the ATS bypass switch 1 is fully automatic and provides a dual redundant automatic switch.

The disclosed concept enables the bypass switch 7, with the example controller 8, to be used as an automatic switching device (rather than a manual switching device) in the case of the ATS switch 6 being locked in at a neutral position, being isolated, or being removed. This eliminates the prior requirement for personnel to remain located near an ATS bypass switch if power from a currently employed power source goes off since manual switching of the bypass switch to the other power source was required.

The controller 8 cooperates with the interlock assembly 14 to automatically configure the switches 6,7 and to monitor the configuration thereof. The position of each separable contact (not shown) in the circuit breakers or contactors (not shown), are monitored by the controller 8, which then controls the respective operating mechanisms 9,10 for moving between the three configurations of the switches 6,7, as appropriate. This can ensure that the system load 13 will not be electrically coupled to both of the two separate power sources 11,12.

As will be discussed, the controller 8 enables the bypass switch 7 to be an automatic switch, rather than just a manual switch, and, also, to do a wide range of transitions, such as for example and without limitation, open, closed, in-phase, load voltage decay, delay (Time Delay Neutral), or any sequence of these transitions in any different order.

The controller 8 employs the position signals 25,31 (e.g., without limitation, from auxiliary contacts (not shown)) to indicate which of the three positions or configurations the two switches 6,7 are in. For safety reasons, for draw-out operation for both contactors and circuit breakers (not shown), the switches 6,7 need to be drawn all the way in or all the way out before switching can occur. The copper stabs (not shown) must be a certain distance from the mating copper (not shown). When the switches 6,7 are locked in (as indicated by the signals 26, 32) or all the way in, the controller 8 allows switching to occur. The ATS switch 6, for example can be racked in and out to provide three different positions indicated by the signals 26,27,28. In the isolated position (indicated by the signal 27), the primary (power) connectors (not shown) are disengaged and far enough from the stabs (not shown) to allow electrical testing of the contactors or circuit breakers (not shown) by a switch (not shown) on the front door (not shown) of the enclosure 41. In the removed state (indicated by the signal 28), a secondary connector (for control and status signals) is disengaged and the ATS switch 6 is ready to be removed from the enclosure 41. During the isolated or removed states of the ATS switch 6, the bypass switch 7 is enabled as an automatic switch by the controller 8.

Figure 3:
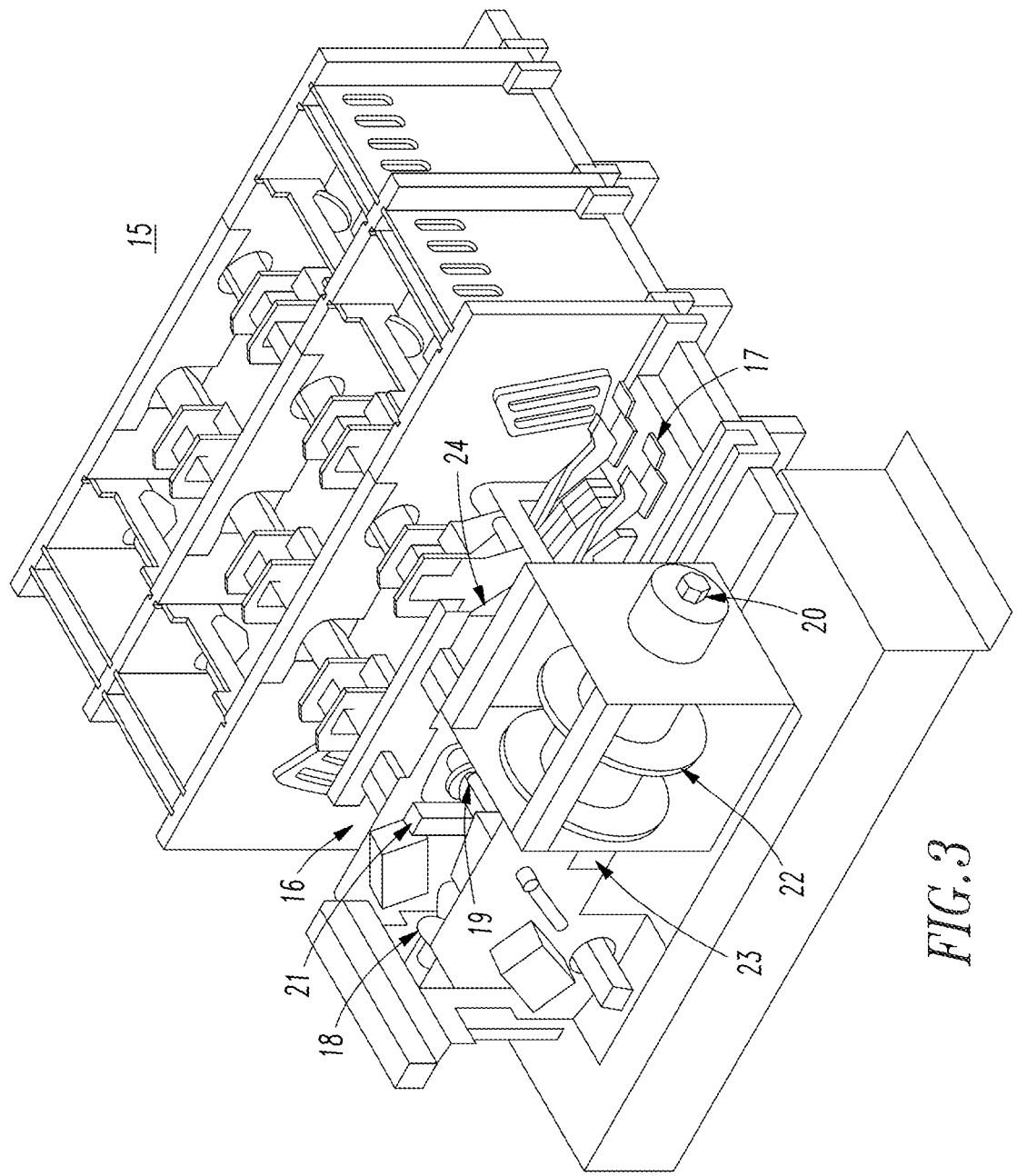
FIG. 3 is an isometric view of one of the contactors of the ATS switch showing the mechanism and the power assembly of FIG. 1.

FIG. 3 shows an example electromechanical, three-position switch, which is a contactor 15. The three positions are closed on the first power source 11 (FIG. 1), neutral, and closed on the second power source 12 (FIG. 1). Switching between the different power sources, and latching on one power source, is accomplished through a combination of solenoids (not shown) and springs 20,23, which change the position of the contactor 15 and its latch mechanism, such as mechanical latch 19.

During normal operation, the contactor 15 is mechanically latched with load output terminal 24 electrically connected to the first power source input terminal 16 (e.g., terminal 3T1 of FIG. 1). In order to change positions and cause the load output terminal 24 (e.g., terminal 5T1 of FIG. 1) to be electrically connected to the second power source input terminal 17 (e.g., terminal 4T1 of FIG. 1), the controller 8 energizes trip coil 18 with a corresponding one of the open signals 35,38 (FIG. 4) output by the controller 8. This releases the mechanical latch 19 and allows the main spring 20 to move the contactor 15 into the neutral position. When the contactor 15 is in the neutral position as is indicated by a position switch (not shown) that provides the position signal 31, the controller 8 energizes the source selector coil 21 and de-energizes the trip coil 18. The source selector coil 21 allows the contactor mechanism to move to the second power source (S2) 12 and is energized, with main coil 22, when switching to S2 is needed. When the source selector (not shown) is in position, the controller 8 energizes the main coil 22 with a corresponding one of the close signals 33,36 (FIG. 4) output by the controller 8. This closes the contactor 15 on the second power source input terminal 17. The mechanical latch 19 is then moved into the latched position via the latch spring 23. The resulting transfer is in the order of milliseconds, which allows the use of in-phase on the three-position contactor 15.

For the bypass switch 7, the three coils 22,18,21 are systematically energized using the control signals 36,37,38 from the controller 8. For the ATS switch 6, the control signals 33,34,35 from the controller 8 operate in a similar manner.

During in-phase operation, the controller 8 uses feedback from the contactor position signals 25,31 to change the power sources 11,12 (FIG. 1) in less than the time allotted for the routines 500,600,700,800,900 (FIGS. 5-9) to look ahead and switch. This results in the optimum reconnect angle of 0 degrees for all of the frequency difference values. When the phase difference is within the advance angle window, the "transfer" command from the corresponding one of the control signals 33,34,35,36,37,38 (FIG. 4) is given. The transfer preferably occurs in milliseconds, which allows the use of in-phase on the three-position contactor 15. Position feedback to the controller 8 is through the position signals 25,31.

In the event that the routines 500,600,700,800,900 (FIGS. 5-9) do not sense the correct advance angle based on the frequency difference between the two power sources 11, 12 and also the response time of the contactor 15, a commend from the controller 8 is used to program a delay transfer (or time delay neutral (TDN)) open by the open control signal 38 after a programmed synchronized timer (not shown) of the controller 8 has expired.

In accordance with an important aspect of the disclosed concept, both of the ATS switch 6 and the bypass switch 7 are automatically controlled by the controller 8. The bypass switch 7 performs several types of automatic transfers as are discussed, below, in connection with FIGS. 5-9.

An example of electrical automatic control is that the controller 8 senses the voltages of the two power sources 11,12 and determines if the voltages are from a good and available power source from the signals 39,40 (FIG. 4). The various signals 33-40 (FIG. 4) are employed by the controller 8 along with other signals 25-32 (FIG. 4) to determine the functionality of the output of the ATS bypass switch 1. Automatic operation includes transfers from the first power source 11 to the second power source 12, or from the second power source 12 to the first power source 11. Automatic operation also includes a transfer to a neutral, trip or open position.

Known transfer switches of the "open-transition" type provide a break-before-make transfer sequence. In other words, the system load 13 is electrically disconnected from one power source, prior to being electrically connected to the other power source. The transfer sequence is relatively very quick depending on what type of time delays are set in the controller 8.

Three examples of these time delays include Time Delay Normal to Emergency (TDNE), Time Delay Neutral (TDN), and Time Delay Emergency to Normal (TDEN). The TDN, for example, when set, takes place when the system load 13 is transferred in either direction to prevent excessive in-rush currents due to out-of-phase switching of relatively large motor loads. With any of these time delays being set, the delay of the transfer times-cut before a transfer will occur. A power interruption is noticeable to the system load 13 being serviced.

Figure 5:
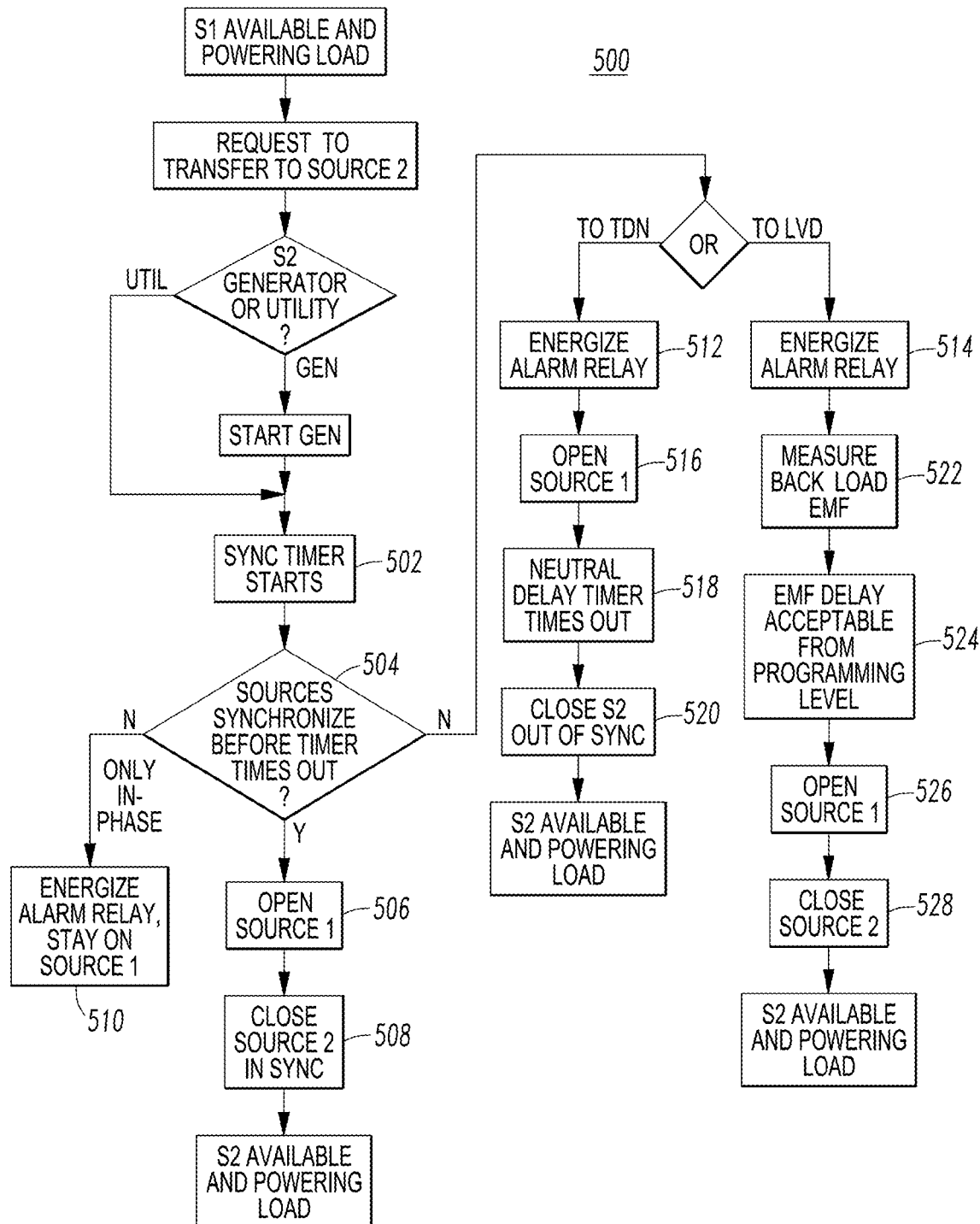
FIGS. 5-9 are flowcharts of routines executed by the controller of FIG. 1 for an in-phase only, in-phase to time delay neutral (neutral delay), or in-phase to load voltage decay mode; a load voltage decay mode; a closed transition default to time delay neutral (neutral delay) or to load voltage decay mode; a closed transition/in-phase default to time delay neutral (neutral delay) mode; and a closed transition/in-phase default to load voltage decay mode, respectively.

FIGS. 5-9 show examples of different routines 500,600, 700,800,900 in which the contactor bypass switch 7 is switched automatically using the example controller 8. An in-phase transition is an open transition that occurs when both of the two power sources are in-phase. FIG. 5 shows the in-phase transition routine 500, which is somewhat similar to a closed transition mode in that both use a synchronization technique. A closed transition will temporarily parallel (in-phase does not do a parallel transfer but uses an open transfer) two live power sources 11,12 in a make-before-break manner when performing a transfer. This achieves a transfer between the two power sources 11,12 with no power interruption. However, both power sources 11,12 must be synchronized in frequency, phase and voltage before the transfer is initiated. An example transfer includes: the first power source 11 from which the system load 13 is being transferred remains closed until the second power source 12, to which the load is being transferred, is also closed. After both have been closed, the first power source 11 from which the load is being transferred is opened (or tripped). The period of time that both power sources are closed is specified, for example and without limitation, at less than 100 milliseconds. Although the closed transition mode is not a substitute for an uninterruptable power source, it does eliminate power interruptions to loads except to those caused by power sources or equipment external to the ATS bypass switch 1.

In FIG. 5, an advance angle is calculated at 504 based on the frequency difference between the two power sources 11,12 and also the response time of the bypass contactor 15 (or circuit breakers (not shown)). If a settable synchronize timer started at 502 does not time out, then the controller 8 continues to synchronize at 504. This results in the optimum reconnect angle of 0 degrees for all of the frequency difference values. When the phase difference between the two power sources 11,12 is within the advance angle window, the "transfer" command is given at 506. This results in an open transition at 508, although both power sources 11,12 are in phase when the transfer occurs.

The example routine 500 can be employed for three modes: In-Phase only at 510, In-Phase to TDN (neutral delay) at 512, or In-Phase to Load Voltage Decay (LVD) at 514. Although the example routine 500 shows the ATS bypass switch 1 progressing from closing the first power source 11 to closing the second power source 12, persons of ordinary skill in the art will appreciate that the ATS bypass switch 1 progressing from closing the second power source 12 to closing the first power source 11 is accomplished in a similar manner.

In FIG. 5, if the phase difference is not within the advance angle window in the settable time period at 504, then the bypass switch 7 transfers with a delay that is set for Time Delay Neutral (delay setting in neutral) (TDN) at 516,518, 520. This is the In-Phase default to Time Delay Neutral (TDN) mode. In either direction of switching, TDN is a user setting that will count down during a transfer at the neutral or open time of the bypass contactor 15. This includes any delay in the neutral mode (e.g., without limitation, Time Delay Neutral (TDN); Neutral delay; Open delay; Load disconnect). It is the time delay, usually settable by the user, that provides a time for the load disconnect position.

Figure 6:
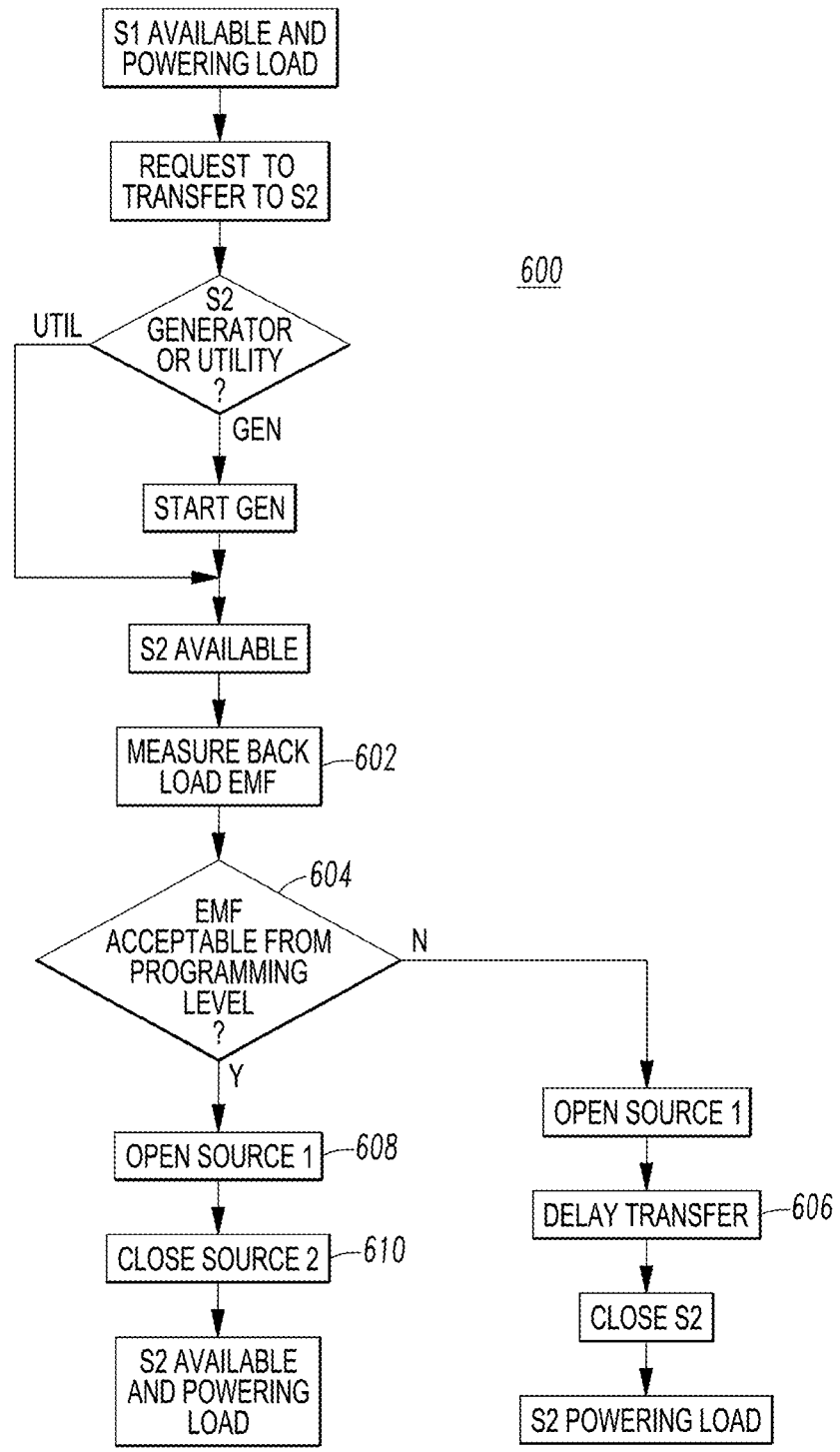

Also, in FIG. 5, if the phase difference is not within the advance angle window in the settable time period at 504, then the bypass switch 7 transfers by the use of Load Voltage Decay (LVD) at 514,522,524,526,528. The LVD employs the load voltage measurements to sense back electromotive force (EMF) at 522 (or at 602 of FIG. 6) that is generated when the ATS bypass switch 1 is in the neutral position. In FIG. 6, this provides a delay in transfer at 606 in either direction if an unacceptable level is sensed at 604 as established by a user programmed level. The transfer will not take place at 608,610 until the back EMF decays below the acceptable programmed level. In FIG. 5, load voltage measurements are sensed at 522 for back EMF that is generated when the ATS bypass switch 1 is in the neutral position. This provides a delay in transfer in either direction if an unacceptable level is sensed as established by a user programmed level at 524. The transfer at 526,528 does not take place until the back EMF decays below the acceptable programmed level. This is the In-Phase default to Load Voltage Decay (LVD) mode.

As previously disclosed with a three-position contactor, when the bypass switch 7 employs two circuit breakers (not shown), the In-Phase transition can be accomplished simply by tripping the closed circuit breaker and closing the other circuit breaker within the response time of the circuit breakers. When the bypass switch 7 employs a two-position contactor (not shown), the controller 8 outputs electrical signals to the two-position contactor operating mechanism 10, which in turn moves separable contacts (not shown) to close on either input terminal 3T1 for S1 or input terminal 4T1 for S2. Suitable dead time does occur for the two-position contactor, but the corresponding in-phase routine, such as 500, includes the response time (dead time) of the contactor.

FIG. 6 shows a Load Voltage Decay (LVD) mode routine 600. Although the example routine 600 shows the ATS bypass switch 1 progressing from closing the first power source 11 to closing the second power source 12, persons of ordinary skill in the art will appreciate that the ATS bypass switch 1 progressing from closing the second power source 12 to closing the first power source 11 is accomplished in a similar manner.

Figure 7:
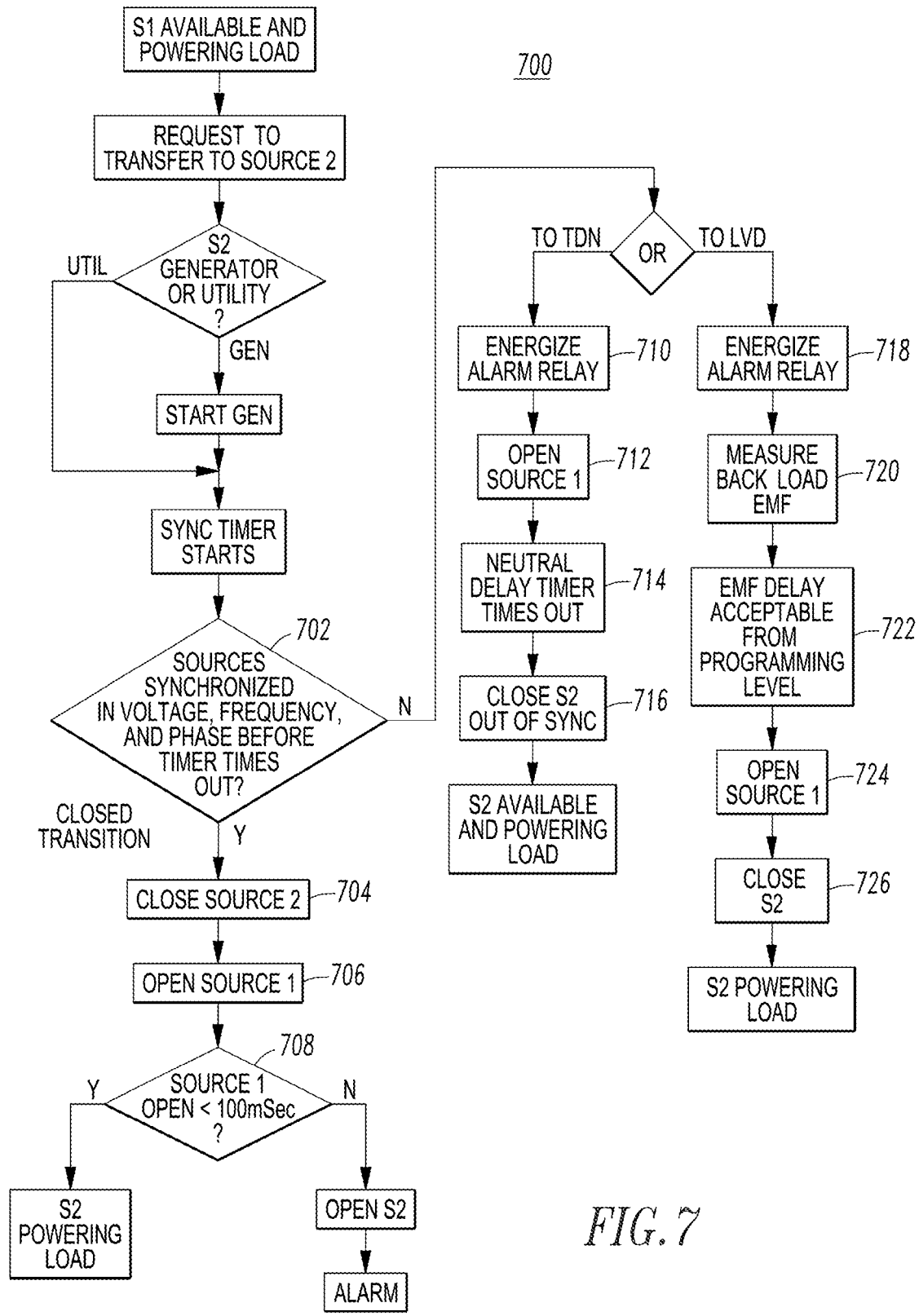

FIG. 7 shows a routine 700 for Closed Transition default to Time Delay Neutral (Neutral Delay) (TDN) or Load Voltage Decay (LVD) modes. Although the example routine 700 shows the ATS bypass switch 1 progressing from closing the first power source 11 to closing the second power source 12, persons of ordinary skill in the art will appreciate that the ATS bypass switch 1 progressing from closing the second power source 12 to closing the first power source 11 is accomplished in a similar manner.

In FIG. 7, the Closed Transition will temporarily parallel two live power sources 11,12 in a make-before-break manner when performing a transfer. Both power sources 11,12 are synchronized in frequency, phase, and voltage before the transfer is initiated at 702,704. A transfer example is the first power source 11 from which the load is being transferred remains closed until the second power source 12, to which the load is being transferred, is also closed. After both have been closed, the first power source 11 from which the load is being transferred is opened (tripped) at 702,704,706. The period of time that both power sources are closed is, for example and without limitation, less than 100 milliseconds at 708. If synchronization is not achieved within the window in the settable time period at 702, then the ATS bypass switch 1 transfers with a delay that is set for Time Delay Neutral (delay setting in neutral) (TDN) at 710,712,714,716.

For a Closed Transition default to Load Voltage Decay (LVD) mode, if synchronization is not achieved within the window in the settable time period at 702, then the ATS bypass switch 1 transfers, by the use of Load Voltage Decay (LVD) at 718,720,722,724,726. Load voltage measurements are sensed at 722 of back EMF that is generated when the ATS bypass switch 1 is in the neutral position. This provides a delay in transfer in either direction if an unacceptable level is sensed as established by a user programmed level at 722. The transfer will not take place at 724,726 until the back EMF decays below the acceptable programmed level at 722.

Figure 8:
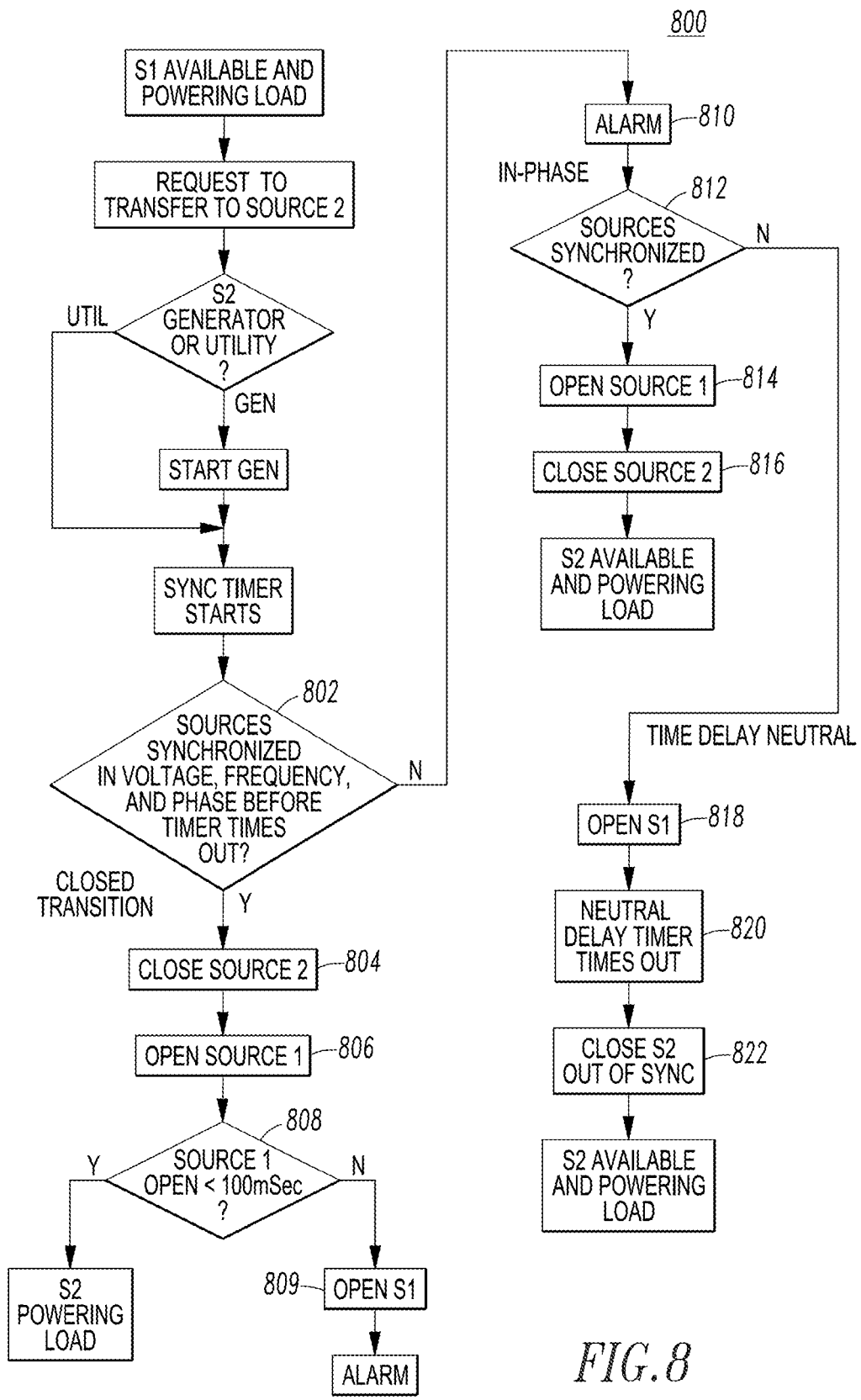

FIG. 8 shows a routine 800 for a Closed Transition/In-Phase default to Time Delay Neutral (TDN) mode. Although the example routine 800 shows the ATS bypass switch 1 progressing from closing the first power source 11 to closing the second power source 12, persons of ordinary skill in the art will appreciate that the ATS bypass switch 1 progressing from closing the second power source 12 to closing the first power source 11 is accomplished in a similar manner.

The Closed Transition will temporarily parallel two live power sources 11,12 in a make-before-break scheme when performing a transfer. At 802, both power sources 11,12 are synchronized in frequency, phase, and voltage before the transfer is initiated. A transfer example would be the first power source 11 from which the load is being transferred remains closed until the second power source 12, to which the load is being transferred, is also closed. After both have been closed, the first power source 11 from which the load is being transferred is opened (tripped) at 804,806. The period of time that both power sources 11,12 are closed is, for example and without limitation, less than 100 milliseconds at 808. If closed transition synchronization is not achieved within the window in the settable time period at 802, then starting at 810 an In-phase transition commences, which is an open transition that occurs when both power sources 11,12 are in-phase. The advance angle is calculated at 812 based on the frequency difference between the two power sources 11,12 and also the response time of the bypass contactor 15. This results in the optimum reconnect angle of 0 degrees for all of the frequency difference values. When the phase difference is within the advance angle window, the "transfer" command is given at 814,816. If the phase difference is not within the advance angle window at 812 in the settable time period, then the ATS bypass switch 1 transfers with a delay that is set for Time Delay Neutral (delay setting in neutral) (TDN) at 818,820,822.

Figure 9:
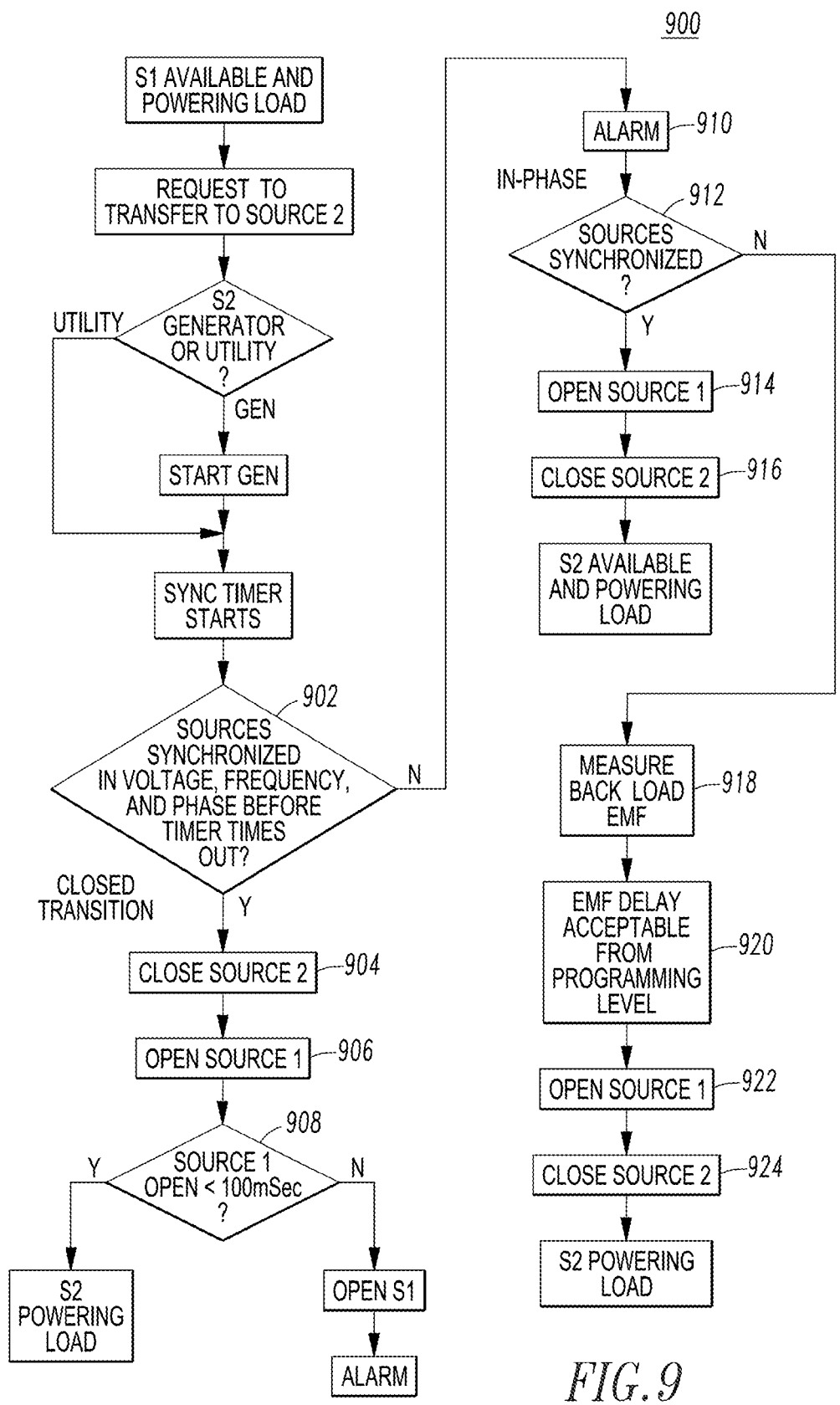

FIG. 9 shows a routine 900 for Closed Transition/In-Phase default to Load Voltage Decay (LVD). Although the example routine 900 shows the ATS bypass switch 1 progressing from closing the first power source 11 to closing the second power source 12, persons of ordinary skill in the art will appreciate that the ATS bypass switch 1 progressing from closing the second power source 12 to closing the first power source 11 is accomplished in a similar manner.

The Closed Transition will temporarily parallel the two live power sources 11,12 in a make-before-break manner when performing a transfer. Both power sources 11,12 are synchronized in frequency, phase, and voltage at 902 before the transfer is initiated. A transfer example would be the first power source 11 from which the load is being transferred remains closed until the second power source 12, to which the load is being transferred, is also closed. After both power sources 11,12 have been closed, the first power source 11 from which the load is being transferred is opened (tripped) at 904,906. The period of time that both power sources are closed is specified, for example and without limitation, at less than 100 milliseconds at 908. If closed transition synchronization is not achieved within the window in the settable time period at 902, the ATS bypass switch 1 goes into an In-phase transition beginning at 910 which is an open transition that occurs when both power sources 11,12 are in-phase. The advance angle is calculated based on the frequency difference between the two power sources 11,12 and also the response time of the bypass contactor 15. This results in the optimum reconnect angle of 0 degrees for all of the frequency difference values. When the phase difference is within the advance angle window, the "transfer" command is given at 914,916. If the phase difference is not within the advance angle window at 912 in the settable time period, then the ATS bypass switch 1 transfers by the use of Load Voltage Decay (LVD) at 918,920,922,924. Load voltage measurements are sensed at 918 for back EMF that is generated when the ATS bypass switch 1 is in the neutral position. This provides a delay in transfer in either direction if an unacceptable level is sensed as established by a user programmed level. The transfer at 922,924 will not take place until the back EMF decays below the acceptable programmed level set at 920.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An ATS bypass switch assembly for connecting and disconnecting first and second power sources to and from a load, the ATS bypass switch assembly comprising:
   a draw-out ATS switch, wherein said draw out ATS switch includes an electrical switching apparatus and wherein said draw-out ATS switch is movable among a locked in neutral state, an isolated state and a removed state, wherein in each of said locked in neutral state, said isolated state and said removed state said draw-out ATS switch is electrically disconnected from the first and second power sources;
   a bypass switch; and
   a processor configured to: (i) automatically control said draw-out ATS switch, (ii) monitor a present state of said draw-out ATS switch, and (iii) responsive to determining that said present state of said draw-out ATS switch is one of said locked in neutral state, said isolated state, or said removed state, enable automatic control of said bypass switch by said processor by changing a mode of operation of said bypass switch from operation as just a manual switching device to operation as an automatic switching device under control of said processor.

2. The ATS bypass switch assembly of claim 1 wherein said electrical switching apparatus is two circuit breaker or a contactor, and wherein said bypass switch includes a second electrical switching apparatus comprising two second circuit breakers or a second contactor.

3. The ATS bypass switch assembly of claim 1 wherein said processor is further configured to, when said automatic control of said bypass switch is enabled, automatically control said bypass switch in an in-phase transition mode.

4. The ATS bypass switch assembly of claim 1 wherein said processor is further configured to, when said automatic control of said bypass switch is enabled, automatically control said bypass switch in a load voltage decay mode.

5. The ATS bypass switch assembly of claim 1 wherein said processor is further configured too when said automatic control of said bypass switch is enabled, automatically control said bypass switch in a closed/in-phase transition default to time delay neutral mode.

6. The ATS bypass switch assembly of claim 1 wherein said processor is further configured to, when said automatic control of said bypass switch is enabled, automatically control said bypass switch in a closed/in-phase transition default to load voltage decay mode.

7. The ATS bypass switch assembly of claim 1 wherein said processor is further configured to, when said automatic control of said bypass switch is enabled, automatically control said bypass switch in a closed transition default to time delay neutral mode.

8. The ATS bypass switch assembly of claim 1 wherein said processor is further configured to, when said automatic control of said bypass switch is enabled, automatically control said bypass switch in a closed transition default to load voltage decay mode.

9. The ATS bypass switch assembly of claim 1 wherein said processor is further configured to, when said automatic control of said bypass switch is enabled, automatically control said bypass switch in an in-phase default to time delay neutral mode.

10. The ATS bypass switch assembly of claim 1 wherein said processor is further configured to, when said automatic control of said bypass switch is enabled, automatically control said bypass switch in an in-phase default to load voltage decay mode.

11. The ATS bypass switch assembly of claim 1 wherein said ATS bypass switch is structured to generate a plurality of electrical signals which indicate said present state of said draw-out ATS switch, and wherein said processor is further configured to input said plurality of electrical signals and use said plurality of electrical signals to monitor said present state of said draw-out ATS switch.

12. An ATS bypass switch assembly for connecting and disconnecting first and second power sources to and from a load, the ATS bypass switch assembly comprising:
 a first switch;
 a second switch; and
 a controller configured to: (i) automatically control said first switch, and enable automatic control of said second switch after determining that said first switch is electrically disconnected from the first and second power sources by changing a mode of operation of said second switch from operation as just a manual switching device to operation as an automatic switching device under control of said controller.

13. The ATS bypass switch assembly of claim 12 wherein said first switch includes a first electrical switching apparatus comprising two circuit breakers or a contactor, and wherein said second switch includes a second electrical switching apparatus comprising two second circuit breakers or a second contactor.

14. The ATS bypass switch assembly of claim 12 wherein said controller includes a processor that is further configured to, when said automatic control of said second switch is enabled, automatically control said second switch in an in-phase transition mode.

15. The ATS bypass switch assembly of claim 12 wherein said controller includes a processor that is further configured to, when said automatic control of said second switch is enabled, automatically control said second switch in a load voltage decay mode.

16. The ATS bypass switch assembly of claim 12 wherein said controller includes a processor that is further configured to, when said automatic control of said second switch is enabled, automatically control said second switch in a closed/in-phase transition default to time delay neutral mode.

17. The ATS bypass switch assembly of claim 12 wherein said controller includes a processor that is further configured to, when said automatic control of said second switch is enabled, automatically control said second switch in a closed/in-phase transition default to load voltage decay anode.

18. The ATS bypass switch assembly of claim 12 wherein said controller includes a processor that is further configured to, when said automatic control of said second switch is enabled, automatically control said second switch in a closed transition default to time delay neutral mode.

19. The ATS bypass switch assembly of claim 12 wherein said controller includes a processor that is further configured to, when said automatic control of said second switch is enabled, automatically control said second switch in a closed transition default to load voltage decay mode.

20. The ATS bypass switch assembly of claim 12 wherein said controller includes a processor that is further configured to, when said automatic control of said second switch is enabled, automatically control said second switch in an in-phase default to time delay neutral mode or an in-phase default to load voltage decay mode.

21. The ATS bypass switch assembly of claim 12 wherein the first switch is a ATS switch and the second switch is a bypass switch.

22. The ATS bypass switch assembly of claim 21 wherein at least one the ATS switch and the bypass switch is a draw-out switch.

23. A method of controlling an ATS bypass switch assembly that includes a first switch, a second switch and a controller, wherein said first switch includes an electrical switching apparatus structured to electrically connect a load to a first power source, electrically connect the load to a second power source, or electrically disconnect the load from the first and second power sources, the method comprising:
 enabling automatic control of said first switch by said controller;
 receiving one or more signals indicative of a present state of said first switch;

determining that said one or more signals indicate that said first switch is electrically disconnected from the first and second power sources; and responsive to determining that said one or more signals indicate that said first switch is electrically disconnected from the first and second power sources, enabling automatic control of said second switch by said controller by changing a mode of operation of said second switch from operation as just a manual switching device to operation as an automatic switching device under control of said controller.

24. The ATS bypass switch assembly of claim 1 wherein said processor is further configured to automatically control said ATS switch bypass switch assembly in a closed transition mode, a time delay neutral mode, or a closed to in-phase mode.

25. The ATS bypass switch assembly of claim 12 wherein said processor is further structured to automatically control said ATS switch bypass switch assembly in a closed transition mode, a time delay neutral mode, or a closed to in-phase mode.

\* \* \* \* \*